United States Patent
Naruskevicius et al.

(10) Patent No.: US 9,551,073 B2
(45) Date of Patent: Jan. 24, 2017

(54) METHOD FOR DEPOSITING A FIRST METALLIC LAYER ONTO NON-CONDUCTIVE POLYMERS

(71) Applicant: Atotech Deutschland GmbH, Berlin (DE)

(72) Inventors: Leonas Naruskevicius, Vilnius (LT); Mykolas Baranauskas, Vilnius (LT); Loreta Tamasiunaite Tamasauskaite, Vilnius (LT); Ona Gyliene, Vilnius (LT)

(73) Assignee: Atotech Deutschland GmbH, Berlin (DE)

( * ) Notice: Subject to any disclaimer, the term of this patent is extended or adjusted under 35 U.S.C. 154(b) by 3 days.

(21) Appl. No.: 14/765,594

(22) PCT Filed: Jan. 15, 2014

(86) PCT No.: PCT/EP2014/050657
§ 371 (c)(1),
(2) Date: Aug. 4, 2015

(87) PCT Pub. No.: WO2014/124773
PCT Pub. Date: Aug. 21, 2014

(65) Prior Publication Data
US 2015/0368806 A1 Dec. 24, 2015

(30) Foreign Application Priority Data
Feb. 13, 2013 (EP) .................................... 13155083

(51) Int. Cl.
| C23C 18/24 | (2006.01) |
| C23C 18/22 | (2006.01) |
| C23C 18/30 | (2006.01) |
| C23C 18/32 | (2006.01) |
| C09K 13/04 | (2006.01) |
| C23C 18/16 | (2006.01) |

(52) U.S. Cl.
CPC ............... *C23C 18/24* (2013.01); *C09K 13/04* (2013.01); *C23C 18/166* (2013.01); *C23C 18/168* (2013.01); *C23C 18/22* (2013.01); *C23C 18/30* (2013.01); *C23C 18/32* (2013.01)

(58) Field of Classification Search
None
See application file for complete search history.

(56) References Cited

U.S. PATENT DOCUMENTS

| 4,054,693 A | 10/1977 | Leech et al. |
| 2009/0092757 A1 | 4/2009 | Satou et al. |
| 2011/0140035 A1 | 6/2011 | Schildmann et al. |

FOREIGN PATENT DOCUMENTS

| EP | 2009142 | * 12/2008 |
| LT | 2008082 | 5/2010 |

OTHER PUBLICATIONS

PCT/EP2014/050657; PCT International Search Report and Written Opinion of the International Searching Authority dated Oct. 24, 2014.

* cited by examiner

*Primary Examiner* — Nathan T Leong
(74) *Attorney, Agent, or Firm* — Renner, Otto, Boisselle & Sklar, LLP

(57) ABSTRACT

The present invention relates to the etching, activation and deposition of a first metal or metal alloy layer onto non-conductive polymers. The non-conductive polymer is etched with an aqueous solution comprising 0.75 to 3.6 g/l permanganate ions in 60 to 80 vol.-% sulfuric acid, activating with a solution comprising a noble metal and depositing a first metal or metal alloy by immersion-type or electroless (autocatalytic) plating. The first metal or metal alloy layer obtained has a high adhesion on the non-conductive polymer and serves as a plating base for electroplating further metal and/or metal alloy layer(s) thereon.

12 Claims, No Drawings

METHOD FOR DEPOSITING A FIRST METALLIC LAYER ONTO NON-CONDUCTIVE POLYMERS

The present application is a U.S. National Stage Application based on and claiming benefit and priority under 35 U.S.C. §371 of International Application No. PCT/EP2014/050657, filed 15 Jan. 2014, which in turn claims benefit of and priority to European Application No. 13155083.2 filed 13 Feb. 2013, the entirety of both of which is hereby incorporated herein by reference.

FIELD OF THE INVENTION

The invention relates to the preparation of the surface of non-conductive polymers prior to wet-chemical metallisation and can be used in various industrial areas, where decorative or functional metallic coats on non-conductive polymers are required.

BACKGROUND OF THE INVENTION

The traditional technique of wet-chemical metallisation consists of etching the surface of non-conductive polymers with chromic acid solutions, catalytic activation with a solution comprising a noble metal, and the wet-chemical metallisation to obtain a first metallic layer, usually a first layer of copper or nickel (alloys).

Etching is required to provide hydrophilic properties to the surface of the non-conductive polymers which are important to adsorb sufficient amounts of noble metal from the aqueous activator solution and ensure a good adhesion between the first metallic layer and the non-conductive polymer.

Activation with a solution comprising a noble metal is carried out in order to start wet-chemical deposition of a first metal or metal alloy layer onto the surface of the non-conductive polymer. This first metallic layer then serves as the plating base for depositing one or more metallic layers thereon by electroplating.

The main disadvantages of the traditional technique is the carcinogenicity of chromic acid (hexavalent chromium) used for etching the surface of the non-conductive polymer.

The US application 2005/0199587 A1 discloses an acidic etching solution for non-conductive polymers comprising 20 to 70 g/l potassium permanganate. The optimum concentration of potassium permanganate is about 50 g/l. When the permanganate ion concentration is lower than 20 g/l the solution is ineffective, whereas the upper margin of concentration is limited by the solubility of potassium permanganate. After etching, the activation is carried out with palladium salt solutions containing amines as complexing agents and later the non-conductive polymer is processed with a reducing agent, e.g. a borohydride, a hypophosphite or a hydrazine solution.

In case of a high permanganate concentration in the etching solution (recommended about 50 g/l and about 40 vol.-% of sulfuric or phosphoric acid), permanganate decomposes easily especially at an elevated temperature of e.g. 37° C. At this temperature, the etching solution becomes ineffective after 4 to 6 h. The wettability of the non-conductive polymer then is not high enough for adsorbing a sufficient amount of noble metal from the aqueous activator solution. Furthermore, the adhesion between non-conductive polymer and plated metallic layer(s) decreases significantly. In addition, the insoluble permanganate dissociation products are enriched in the etching solution and can contaminate the surface to be plated.

The patent LT 5645 B discloses a method for applying a first metallic layer onto a non-conductive polymer. The aqueous etching solution applied in the first step contains 70 to 90 wt.-% sulfuric acid and 0.0001 to 0.01 wt.-% (0.001 to 0.1 g/l) permanganate. An ionogenic activator solution comprising palladium ions and urea is applied in the second step followed by wet-chemical deposition of a first metallic layer.

An etching solution for poly(aryl-ether-ether-ketone) (PEEK), the solution comprising 1 wt.-% (10 g/l) potassium permanganate, five volume parts (56 vol.-%) of concentrated sulfuric acid, two volume parts of 85% orthophosphoric acid and two volume parts of water is disclosed in the article "Permanganic etching of PEEK" (R. H. Olley, D. C. Bassett, D. J. Blundell, Polymers, 27: 344-348, 1986). However, neither an activation step nor the deposition of a first metallic layer thereon is disclosed in this document. This etching solution was used in Example 4 (comparative) of the present invention.

A method for metallization of a polymer surface is disclosed in in the patent application EP 1 001 052 A2. The polymer surface is etched with a "mild" acidic solution comprising an oxidant. Next, the surface is activated with an aqueous solution of a metal salt selected from cobalt-, silver-, tin and lead salts followed by contacting the surface with a sulfide solution and deposition of a first metallic layer.

OBJECTIVE OF THE PRESENT INVENTION

The objective of the present invention is to provide a method for attaching a first metal or metal alloy layer to a non-conductive polymer with a sufficiently high adhesion and thereby avoiding the usage of carcinogenic substances.

SUMMARY OF THE INVENTION

This objective is solved by a method for depositing a first metal or metal alloy layer onto a non-conductive polymer comprising, in this order, the steps of
  (i) providing a non-conductive polymer,
  (ii) contacting the non-conductive polymer with a liquid comprising 0.75 to 3.6 g/l permanganate ions in 60 to 80 vol.-% sulfuric acid,
  (iii) contacting the etched non-conductive polymer with an activator solution comprising a noble metal and
  (iv) depositing a first metal or metal alloy layer by a wet-chemical method onto the activated non-conductive polymer.

Thereby, a first metal or metal alloy layer having a sufficient adhesion to the non-conductive polymer is obtained. This first metal or metal alloy layer then serves as a suitable plating base for further metal and/or metal alloy layers deposited thereon by electroplating.

DETAILED DESCRIPTION OF THE INVENTION

Non-conductive polymers used as base materials for different applications require a metallic coating which consists of at least one metal or metal alloy layer deposited thereon. Typical applications of this kind are e.g. shower heads or automotive parts which require a metallic coating for decorative purposes. Another important example are electronic components such as printed circuit boards which require a metallic circuitry on top of e.g. a glass fiber filled epoxy resin.

The term non-conductive in respect to polymers is defined herein as not electrically conductive. Hence, the deposition of metallic layer(s) onto such non-conductive polymers by wet-chemical deposition methods such as electroplating requires a preparation of the surface of the non-conductive polymer by the method according to the present invention.

Non-conductive polymer materials to be coated with metallic layer(s) by wet-chemical methods are for example acrylonitrile-butadiene-styrene copolymer (ABS), polycarbonates (PC), ABS-PC composites (also denoted ABS-PC blends), polyamide (PA) and epoxy resins.

The non-conductive polymer is treated in the first step of the present invention with an etching solution comprising 0.75 to 3.6 g/l permanganate ions in 60 to 80 vol.-% sulfuric acid.

The source of permanganate is selected from alkaline metal permanganates and alkaline earth metal permanganates. Preferably, alkaline permanganates are utilized for this purpose. The most preferred sources for permanganate ions are sodium permanganate, potassium permanganate and mixtures thereof.

The etching solution is preferably held at a temperature in the range of 10 to 40° C., more preferably in the range of 20 to 30° C. when contacted with the non-conductive polymer.

The contact time preferably ranges from 1 to 20 min, more preferably from 2 to 10 min.

The etching solution is for example produced by dissolving 1 to 4.7 g/l potassium permanganate in 60 to 80 vol.-% sulfuric acid. If less than 1 g/l of potassium permanganate is used, the effectiveness of etching decreases, i.e. the adhesion of the first metal or metal alloy layer on top of the non-conductive polymer is not sufficient. The same applies for a permanganate ion concentration too high. In addition, a permanganate ion concentration above 3.6 g/l raises safety concerns.

The etching solution can be replenished by adding for example a solution containing 1.0 g/l of potassium permanganate.

The duration of etching a non-conductive polymer with such an etching solution may depend on the processed non-conductive polymer material and can be determined in routine experiments.

In order to increase the stability of the etching solution during storage and use, the solutions of low concentration permanganate ions (0.75 to 3.6 g/l) are used in 60 to 80 vol.-% sulfuric acid. Such an etching solution has a sufficient stability and capability for etching the non-conductive polymer.

The stability in terms of storage and use of the etching solution according to the present invention depends on the density and is sufficient in a density range of 1.7 to 1.82 g/ml, more particularly in the range of 1.72 to 1.8 g/ml.

Phosphoric acid is used in one embodiment of the present invention to adjust the density of the etching solution (which depends on the concentration of sulfuric acid) to the desired range of 1.7 to 1.82 g/ml, more particularly in the range of 1.72 to 1.8 g/ml (measured with a hydrometer). Phosphoric acid can be added to the etching solution in form of ortho-phosphoric acid, meta-phosphoric acid, poly-phosphoric acid and mixtures thereof.

Next, the etched non-conductive polymer is activated with an activator solution comprising a noble metal. The noble metal is preferably selected from the group consisting of silver, gold, ruthenium, rhodium, palladium, osmium, iridium, platinum and mixtures thereof. The noble metal is present in the activator solution in the form or ions and/or as a colloid. The noble metal ions are added to the activator solution as water-soluble noble metal salts such as noble metal chlorides, noble metal acetates and noble metal sulfates. Palladium is the most preferred noble metal.

In one embodiment of the present invention, the activator solution comprises palladium ions. The source of palladium ions is selected from water soluble palladium salts such as palladium chloride, palladium sulfate and palladium acetate.

The concentration of noble metal ions, preferably palladium ions in this type of activator solutions preferably ranges from 10 to 500 mg/l, more preferably from 35 to 250 mg/l.

The non-conductive polymer is preferably contacted with the solution comprising noble metal ions, preferably palladium ions for 1 to 10 min, more preferably for 3 to 6 min. The temperature of the solution comprising noble metal ions, preferably palladium ions is preferably held at a temperature in the range of 20 to 60° C., more preferably 40 to 50° C. for activating the etched non-conductive polymer.

After contacting the non-conductive polymer with an activator solution, the palladium ions deposited onto the non-conductive polymer are reduced to metallic state by contacting the non-conductive polymer with a solution comprising a reducing agent.

Reducing agents in accordance with the present invention are for example hypophosphite ions, borane compounds and hydrazine.

Suitable sources for hypophosphite ions are for example sodium and potassium salts of hypophosphoric acid and their respective hydrates.

Suitable borane compounds are for example sodium borohydride and dimethylaminoborane.

The non-conductive polymer is preferably contacted with the solution comprising a reducing agent for 1 to 10 min, more preferably for 3 to 6 min. The temperature of the solution comprising a reducing agent is preferably held at a temperature in the range of 25 to 60° C., more preferably 30 to 50° C. for this purpose.

The non-conductive polymer is then suited for depositing a first metal or metal alloy layer thereon by either an immersion-type plating reaction or by electroless (autocatalytic) plating.

In a second embodiment of the present invention, the etched non-conductive polymer is activated with a solution comprising a noble metal colloid, preferably a palladium colloid.

The concentration of the noble metal in colloidal form, preferably palladium in colloidal form preferably ranges from 50 to 500 mg/l, more preferably from 150 to 250 mg/l. Such an activator solution is preferably acidic. The most preferable acid is hydrochloric acid. The concentration of hydrochloric acid in the water/acid mixture preferably ranges from 2 to 30 wt.-%, more preferably from 5 to 15 wt.-%.

In one embodiment of the present invention, said colloidal activator solution is prepared by adding a palladium salt in the desired palladium concentration to a mixture of water and an acid together with a tin(II) salt. The concentration of tin ions preferably ranges from 2 to 50 g/l, more preferably from 20 to 25 g/l. Such colloidal palladium activator solutions are disclosed in U.S. Pat. No. 3,011,920 and U.S. Pat. No. 3,682,671.

Next, the non-conductive polymer is rinsed, preferably with water.

The first metal or metal alloy layer is then deposited onto the activated non-conductive polymer by wet-chemical deposition methods which are preferably immersion-type plating or electroless (autocatalytic) plating.

Immersion type-plating bath compositions suitable for depositing a first metal or metal alloy layer onto the activated non-conductive polymer comprise at least one source for metal ions and at least one complexing agent for said metal ions.

Preferably, such immersion-type plating bath compositions do not comprise a strong reducing agent such as formaldehyde or hypophosphite ions.

Preferably, copper, nickel, gold, palladium and other noble metals or alloys thereof are deposited by immersion-type plating as the first metal or metal alloy layer onto the activated non-conductive polymer. Most preferably, the first metal layer deposited as the first metal layer by immersion-type plating is copper or nickel.

The source for metal ions is preferably a water-soluble metal salt such as metal sulfates and metal acetates. The concentration of the source for metal ions preferably ranges from 0.1 to 50 g/l, more preferably from 0.5 to 15 g/l.

The at least one complexing agent is preferably selected from the group comprising amines, alkanolamines, carboxylic acids, polycarboxylic acids, hydroxylcarboxylic acids and aminocarboxylic acids. Most preferably, the at least one complexing agent is selected from the group consisting of ethanolamine, EDTA, tartaric acid, citric acid and N,N,N',N'-tetrakis-(2-hydroxypropyl)-ethylendiamine and salts thereof. The concentration of the at least one complexing agent preferably ranges from 0.1 to 3 mol/l, more preferably from 0.5 to 1.5 mol/l.

The immersion-type plating bath composition is held during plating preferably at a temperature in the range of 30 to 65° C., more preferably 50 to 60° C.

The first metal or metal alloy layer deposited by immersion-type plating onto the activated non-conductive polymer then serves as a plating bath for depositing further metal and/or metal alloy layer(s) thereon by electroplating.

Electroless (autocatalytic) plating bath compositions suitable for depositing a first metal or metal alloy layer onto the activated non-conductive polymer comprise a source for metal ions, a reducing agent, at least one complexing agent and at least one stabilizing agent.

Suitable sources for metal ions are water-soluble metal salts such as sulfates and acetates.

Suitable reducing agents for depositing a copper layer by electroless plating is for example formaldehyde, for depositing a nickel alloy layer for example hypophosphite ions added as sodium hypophosphite (Ni—P alloys) and borane compounds such as dimethylaminoborane (Ni—B alloys).

Suitable complexing agents are for example amines, alkanolamines such as ethanol amine, carboxylic acids such as acetic acid, polycarboxylic acids such as succinic acid, hydroxylcarboxylic acids such as citric acid, aminocarboxylic acids such as EDTA and their respective salts.

Such plating bath compositions are known in the art and the plating parameters such as plating bath temperature and plating time can be optimized for the desired application by a skilled person.

Optionally, the non-conductive polymer is rinsed with e.g. water between the individual process steps discussed above.

One or more further metal and/or metal alloy layer(s) can then be deposited onto the first metal or metal alloy layer by electroplating.

EXAMPLES

The invention will now be illustrated by reference to the following non-limiting examples.

Substrates made of ABS sanitary valve covers were etched with different aqueous solutions comprising permanganate ions and sulfuric acid at a temperature of 20° C. for 4 min.

The etched substrates were then activated by dipping them into an aqueous activator solution comprising palladium ions followed by reduction of the palladium ions with an aqueous solution comprising hypophosphite ions (Covertron® Activator (200 mg/l palladium ions) and Covertron® Reducer, both products of Atotech Deutschland GmbH).

Next, a Ni—P alloy layer was deposited by electroless (autocatalytic) onto the activated substrate (10 min at 40° C., Adhemax® Ni LFS, a product of Atotech Deutschland GmbH).

In order to evaluate the adhesion strength, the first metallic layer was thickened with copper as the second metallic layer from an acidic electroplating bath (70 min at room temperature, Cupracid® HT, a product of Atotech Deutschland GmbH).

The power required for tearing away the metallic layer consisting of the first metallic layer and the electroplated second metallic layer of copper of the width of 11 mm from the plated substrate was then determined without further heat treatment. The pull distance was 25 mm and the pull speed was set to 200 mm/min for each example. A pull strength tester 5542 from company Instron was used.

Example 1

A solution comprising 80 vol.-% sulfuric acid and 3 g/l sodium permanganate (3 g/l sodium permanganate in 80 vol.-% sulfuric acid) was used for etching the ABS substrate material.

The adhesion measured was 1.4 N/mm.

Example 2

A solution comprising 62.5 vol.-% sulfuric acid and 2.8 g/l sodium permanganate (2.8 g/l sodium permanganate in 62.5 vol.-% sulfuric acid) was used for etching the ABS substrate material.

The adhesion measured was 1.49 N/mm.

Example 3 (Comparative)

A solution comprising 56 vol.-% sulfuric acid and 10 g/l (1 wt.-%) sodium permanganate (10 g/l (1 wt.-%) sodium permanganate in 56 vol.-% sulfuric acid) was used for etching the ABS substrate material.

The adhesion measured was 1.04 N/mm.

Example 4 (Comparative)

A solution comprising 85 vol.-% sulfuric acid and 3 g/l sodium permanganate (3 g/l sodium permanganate in 85 vol.-% sulfuric acid) was used for etching the ABS substrate material.

The adhesion measured was 0.11 N/mm.

The invention claimed is:

1. A method for depositing a first metal or metal alloy layer onto a non-conductive polymer comprising, in this order, the steps of
   (i) providing a non-conductive polymer,
   (ii) contacting the non-conductive polymer with an etching solution comprising 0.75 to 3.6 g/l permanganate ions in 60 to 80 vol.-% sulfuric acid, (iii) contacting the etched non-conductive polymer with an activator solution comprising a noble metal and (iv) depositing a first metal or metal alloy layer by a wet-chemical method onto the activated non-conductive polymer, wherein the etching solution further comprises phosphoric acid and the density of the etching solution is adjusted with the phosphoric acid to a range of 1.70 to 1.82 g/ml.

2. The method for depositing a first metal or metal alloy layer onto a non-conductive polymer according to claim 1 wherein the non-conductive polymer is selected from the group consisting of acrylonitrile-butadiene-styrene copolymer, polycarbonates, acrylonitrile-butadiene-styrene copolymer-polycarbonate blends, polyamide and epoxy resins.

3. The method for depositing a first metal or metal alloy layer onto a non-conductive polymer according to claim 1 wherein the temperature of the etching solution ranges from 10 to 40° C.

4. The method for depositing a first metal or metal alloy layer onto a non-conductive polymer according to claim 1 wherein the source of permanganate ions is selected from the group consisting of alkaline- and alkaline earth-metal permanganates.

5. The method for depositing a first metal or metal alloy layer onto a non-conductive polymer according to claim 1 wherein the source of permanganate ions is selected from the group consisting of sodium permanganate and potassium permanganate.

6. The method for depositing a first metal or metal alloy layer onto a non-conductive polymer according to claim 1 wherein the noble metal is selected from the group consisting of silver, gold, ruthenium, rhodium, palladium, osmium, iridium, platinum and mixtures thereof.

7. The method for depositing a first metal or metal alloy layer onto a non-conductive polymer according to claim 1 wherein the activator solution is an aqueous solution comprising palladium ions.

8. The method for depositing a first metal or metal alloy layer onto a non-conductive polymer according to claim 7 wherein the concentration of palladium ions ranges from 10 to 500 mg/l.

9. The method for depositing a first metal or metal alloy layer onto a non-conductive polymer according to claim 1 wherein the activator solution is an aqueous solution comprising colloidal palladium.

10. The method for depositing a first metal or metal alloy layer onto a non-conductive polymer according to claim 9 wherein the concentration of the colloidal palladium ranges from 50 to 500 mg/l.

11. The method for depositing a first metal or metal alloy layer onto a non-conductive polymer according to claim 1 wherein the first metal layer is deposited by electroless autocatalytic plating or immersion-type plating.

12. The method for depositing a first metal or metal alloy layer onto a non-conductive polymer according to claim 1 wherein the first metal or metal alloy layer is selected from copper, nickel and nickel alloys.

* * * * *